March 2, 1971     W. N. HANDLEY ET AL     3,566,492

PATTERN SHEARING APPARATUS

Filed June 20, 1968     2 Sheets-Sheet 1

INVENTORS
WILFRED N. HADLEY
WILLIAM J. HOLM

BY Morse, Altman & Oates

ATTORNEYS

March 2, 1971   W. N. HANDLEY ET AL   3,566,492
PATTERN SHEARING APPARATUS

Filed June 20, 1968   2 Sheets-Sheet 2

INVENTORS
WILFRED N. HADLEY
WILLIAM J. HOLM
BY

ATTORNEYS

United States Patent Office

3,566,492
Patented Mar. 2, 1971

---

3,566,492
PATTERN SHEARING APPARATUS
Wilfred N. Hadley and William J. Holm, Springfield, Vt., assignors to Riggs & Lombard, Inc., Lowell, Mass.
Filed June 20, 1968, Ser. No. 738,674
Int. Cl. B06c 23/02
U.S. Cl. 26—16                                   1 Claim

ABSTRACT OF THE DISCLOSURE

Pile type fabrics, such as corduroys and the like, are provided with embossed patterns formed in the pile surface. The material is fed through a shearing machine which is provided with an embossed roller in place of the conventional cloth rest. The material is held tightly against the embossed roller surface so that some portions of the cloth pile are shorn to heights different from other portions to produce a pattern over the fabric surface corresponding to the design on the roller. The roller comprises a core over which is mounted a replaceable plastic sleeve on the outer surface of which is embossed the design.

BACKGROUND OF THE INVENTION

(1) Field of the invention

This invention relates generally to fabrics with embossed patterns and more particularly is directed towards pile type fabrics having embossed shorn patterns including a novel method and associated apparatus for producing an embossed pattern on pile fabric.

(2) Description of the prior art

Deep pile fabrics, such as terry loops, velvet and the like, have been made with patterned embossed surfaces using shearing techniques in which selected portions of the pile surface have been depressed by an embossed member. A solution which is preapplied to the material causes the depressed portions to remain depressed while other portions of the fabric remain raised and subject to shearing blades. After shearing the raised pile, the material must be washed to remove the solution and permit the unshorn pressed areas to be raised up in the embossed pattern. This technique is both time consuming and expensive. In addition, it has worked only with deeply-piled materials and is unsatisfactory with low-piled material such as corduroys.

Accordingly, it is an object of the present invention to provide a low-pile material such as corduroy having an embossed surface and to provide a new and improved method and apparatus for embossing pile fabrics.

SUMMARY OF THE INVENTION

This invention features a novel low-pile material, such as corduroy or the like, which is formed with an embossed pattern over its pile surface. This invention also features a method for embossing pile fabrics comprising the steps of feeding the fabric in open width form into cutting relation with a shearing machine, tensioning the fabric against an embossed support so that portions of the fabric are raised while other portons are depressed when passing against the cutting elements.

This invention also features a novel apparatus for shearing an embossed pattern over the face of pile fabric, comprising a cloth shearing apparatus having a shearing head and an embossed roller over which the material is fed against the shearing elements. The fabric is held tightly against the roller with the pile surface disposed outwardly of the embossed roller in position to be cut by the shearing head. Tension on the material causes portions of the fabric to be depressed and other portions to be raised according to the embossed pattern so that as the fabric passes against the shearing elements an embossed pattern will be cut in the pile surface. The invention also includes a novel embossed roller comprising a core and a replaceable plastic sleeve in which the embossed design is formed.

DESCRIPTION OF THE PREFERRED EMBODIMENTS

Figure 1:
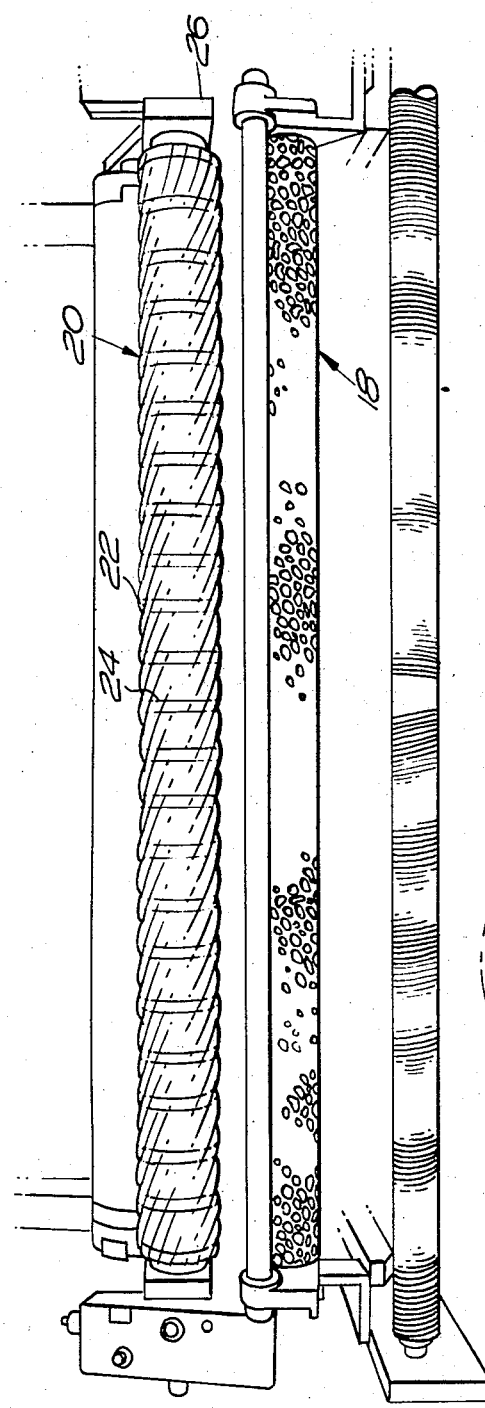
FIG. 1 is a view in front elevation of a shearing apparatus made according to the invention.
Figure 3:
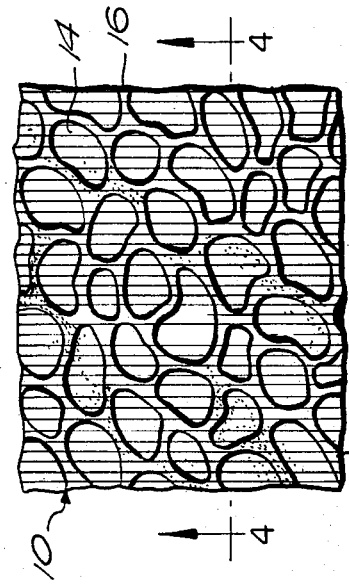
FIG. 3 is a plan view of a portion of an embossed corduroy material.
Figure 2:
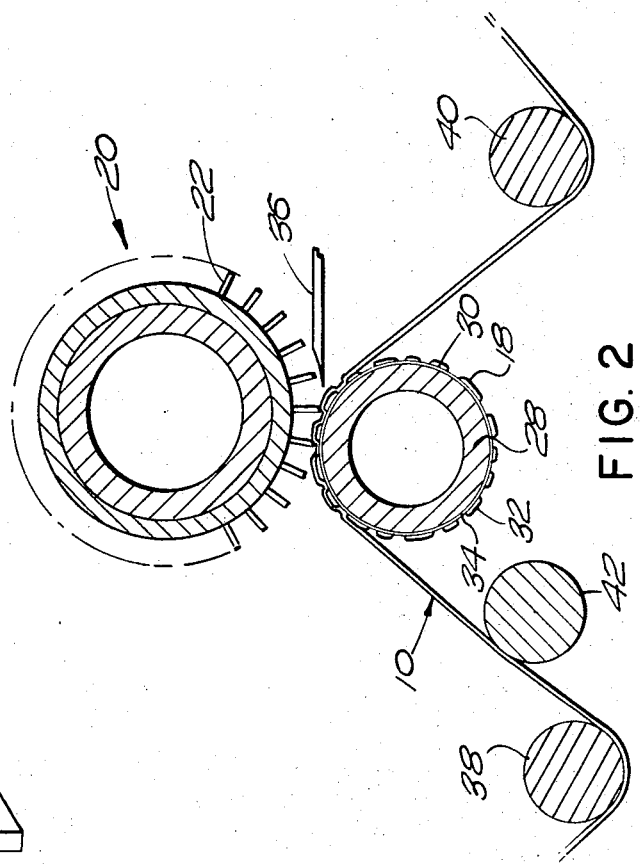
FIG. 2 is a detailed cross-sectional view of the FIG. 1 apparatus showing the primary operating components.

Referring now to the drawings, there is illustrated in FIGS. 1 and 2 a shearing apparatus for use in shearing an embossed pattern on pile fabrics, particularly low pile fabrics such as corduroy or the like. In FIG. 3 there is shown a section of corduroy material 10 which has been shorn with an embossed pattern. The material 10 is characterized by the usual longitudinal wales 12 and features embossed areas 14 which may be of any desired configuration such as the random pattern shown.

Figure 4:
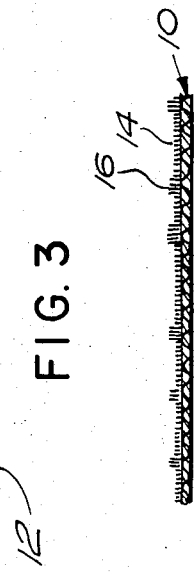
FIG. 4 is a cross-sectional view taken along the line 4—4 of FIG. 3.

As appears in FIG. 4 the pile of the corduroy within the embossed areas 14 is trimmed to a lower height than the surrounding areas 16. Corduroy normally is a very low pile material initially and heretofore embossed corduroy has not been known to be available since no techniques or equipment existed capable of shearing embossed patterns in such low pile material.

Figure 5:
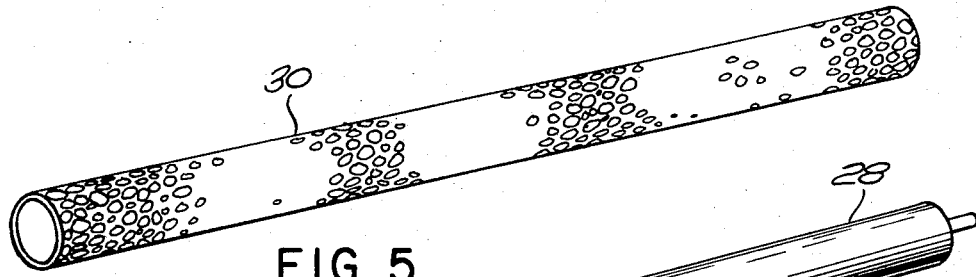
FIG. 5 is a view in perspective of a replaceable embossed sleeve employed in the invention.
Figure 6:
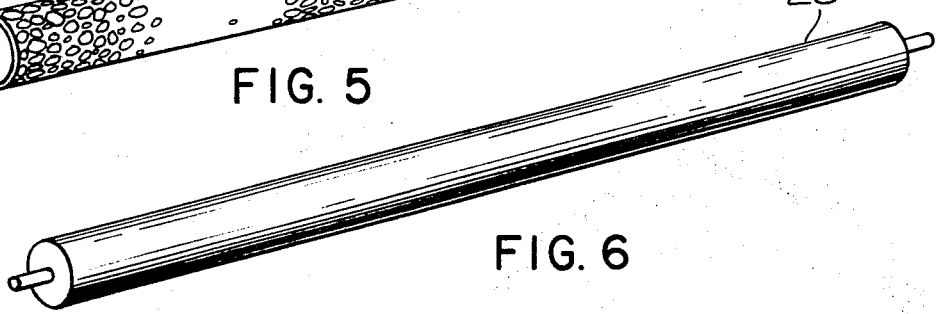
FIG. 6 is a view in perspective of a roller core used in conjunction with the sleeve of FIG. 5.
Figure 7:
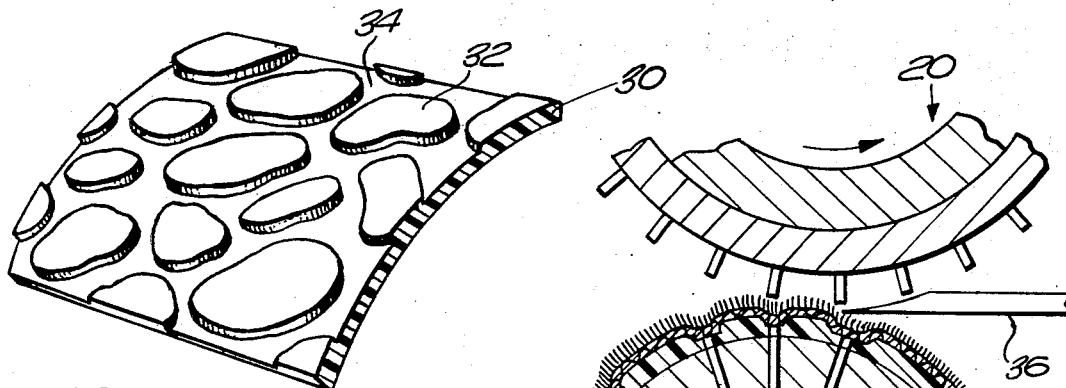
FIG. 7 is a detailed view of the FIG. 5 sleeve on an enlarged scale, and, FIG. 8 is a detailed sectional view showing a modification of the embossed roller.

The method of embossing the corduroy includes the steps of feeding a running length of a corduroy web about an embossed abutment such as a roller 18 shown in FIGS. 1 and 2 and in detail in FIGS. 5, 6 and 7. The web is tensioned against the roller so that some portions of the pile surface, which faces outwardly, will be depressed while other portions will be raised, the raised portions being brought into shearing contact with a shearing revolver 20 as shown in FIGS. 1 and 2. The result will be that the raised portions of the web will be shorn to a lower height than the depressed portions and an embossed pattern will be produced on the web.

The apparatus for performing the embossed shearing includes the embossed roller 18 and the shearing revolver 20 which preferably is of the air-draft revolver type such as disclosed in U.S. Pat. No. 2,606,355 and which is adapted to develop a suction inwardly of the revolver and thus raise the nap of the material for better shearing action. The shearing revolver typically includes spaced cutting elements 22 disposed helically about the revolver and spaced annular supporting rings 24 all of which are disclosed in the above patent. The ends of the revolver are supported in a frame 26 which also supports the ends of the embossed roller 18.

The roller 18, in the preferred embodiment, is comprised of a rotatable cylindrical core 28 on the outer surface of which is mounted a removable sleeve 30 which is generally coextensive with the core. The sleeve 30 preferably is fabricated from plastic of suitable hardness since the plastic may be easily worked by various techniques such as machining, molding and casting and formed with an embossed outer surface comprised of lands 32 and depressions 34 in the desired embossed pattern. The embossed roller is mounted in parallel relation to the shearing revolver 20 and in close proximity thereto so that the web 10, which is carried over and partly around the embossed roller will be brought into shearing contact with the cutting elements 22.

In addition to the shearing revolver 20 the cutting elements may also include a ledger knife 36 which extends into cooperative cutting position with the shearing elements. The apparatus may also include idler rollers 38, 40 and a spreading roller 42 formed with threads those on one end being in a direction opposite to those at the other end. When rotated the threads tend to spread the web 10 transversely and insure the web is fed in a flat, open condition into the bite of the shearing revolver and embossed roller.

Means are also provided for longitudinally tensioning the web to insure that the web is held tightly down against the surface of the embossed roller as it passes against the shearing revolver. By longitudinally tensioning the web, those portions of the web which lie against the lands 32 will be raised in relation to those portions of the web lying in depressions 34. Thus the raised portions of the pile on the lands will be shorn to a height lower than the portions of the pile in the depressions and the embossed pattern shown in FIG. 3 will be produced. In practice, the shearing revolver, the embossed roller and the ledger knife are mounted for micrometer adjustment whereby the spacing and relationship amongst these members may be precisely adjusted to insure that the optimum desired shearing action is obtained and to provide close control over the operation of the unit. By reason of the low pile characteristics of corduroy close control must be maintained over the distance between the revolver, the web, the embossed roller and the ledger knife. Longitudinal tension may be obtained by any suitable means such as braking one roller at the feed end to provide a drag on the web or by running drive rollers at the feed and discharge ends of the apparatus at slightly different speeds, the discharge roller being run faster than the feed roller. Other means may also be employed.

Figure 8:
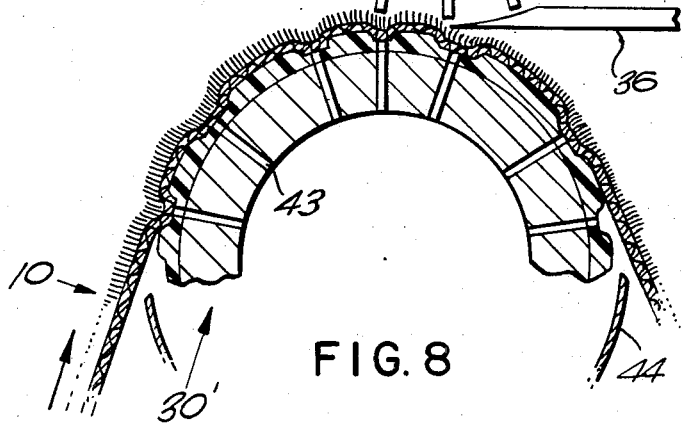

Referring now to FIG. 8 of the drawings there is illustrated a modification of the invention and in this embodiment an embossed roller 30' is formed with radial passages 43 extending from the hollow center of the core to the outer surface of the roller. The core in this instance is connected to a vacuum source whereby the web 10, which passes over the roller, will be held tightly against the embossed surface, conforming the web closely to the sleeve and thereby enhancing the embossing effect produced by the shearing elements. A semi-cylindrical baffle 44 may be provided below the roller to minimize vacuum losses as the roller rotates.

Having thus described the invention, what we claim and desire to obtain by Letters Patent of the United States is:

1. Apparatus for embossing a pile fabric web, comprising
   (a) an air draft shearing revolver,
   (b) a ledger knife mounted in cooperative shearing relation to said revolver,
   (c) a roller mounted in closely spaced parallel relation to said revolver,
   (d) means for feeding said web under longitudinal tension about said revolver to present portions of the pile into shearing contact with said revolver,
   (e) said roller comprising a rigid cylindrical core and a fitted removable outer tubular sleeve, the outer cylindrical surface of which is embossed,
   (f) said core and sleeve being formed with aligned perforations communicating with the depressed portions of the embossed sleeve surface,
   (g) said core being hollow and adapted to be connected to a vacuum source,
   (h) a fixed semi-cylindrical baffle mounted in closely spaced relation to said roller on the side opposite the web-engaging portion of said roller, and,
   (i) a spreading roller engaging said web prior to the embossed roller, said spreading roller being formed with helical threads, the threads on one end having a direction opposite to those on the other end.

References Cited
UNITED STATES PATENTS

| | | | |
|---|---|---|---|
| 2,919,484 | 1/1960 | Parker et al. | 26—69(A) |
| 1,553,830 | 9/1925 | Marble | 26—16 |
| 1,708,763 | 4/1929 | Huss et al. | 26—16 |
| 2,606,355 | 8/1952 | Richardson | 26—15 |
| 2,977,660 | 4/1961 | Gebert et al. | 26—16 |
| 3,008,212 | 11/1961 | Hadley | 26—15 |
| 3,327,366 | 6/1967 | Holm | 26—15 |

FOREIGN PATENTS

| | | | |
|---|---|---|---|
| 184 | 1854 | Great Britain | 26—16 |
| 1,042 | 1855 | Great Britain | 26—16 |
| 2,091 | 1854 | Great Britain | 26—16 |
| 6,095 | 1882 | Great Britain | 26—16 |

ROBERT R. MACKEY, Primary Examiner

U.S. Cl. X.R.

26—69